United States Patent
Zhang et al.

(10) Patent No.: US 12,436,141 B1
(45) Date of Patent: Oct. 7, 2025

(54) METHOD FOR QUANTITATIVE EVALUATION OF SELF-SEALING PROPERTY OF ORGANIC-RICH SHALE

(71) Applicants: Southwest Petroleum University, Chengdu (CN); China University of Geosciences (Wuhan), Wuhan (CN); China University of Petroleum (Beijing), Beijing (CN)

(72) Inventors: Kun Zhang, Chengdu (CN); Xinyang He, Chengdu (CN); Shu Jiang, Wuhan (CN); Yan Song, Beijing (CN); Hulin Niu, Chengdu (CN); Chengzao Jia, Beijing (CN); Zhenxue Jiang, Beijing (CN); Lin Jiang, Beijing (CN); Xueying Wang, Chengdu (CN); Xiong Ding, Chengdu (CN); Yi Shu, Wuhan (CN); Yi Zhang, Chengdu (CN); Yiting Qiao, Chengdu (CN); Jiayi Liu, Chengdu (CN); Jun Peng, Chengdu (CN); Bin Li, Chengdu (CN); Jinhua Liu, Chengdu (CN); Binsong Zheng, Chengdu (CN); Lei Chen, Chengdu (CN); Xuefei Yang, Chengdu (CN); Fengli Han, Chengdu (CN); Weishi Tang, Chengdu (CN); Jingru Ruan, Chengdu (CN); Hengfeng Gou, Chengdu (CN); Yi Xiao, Chengdu (CN); Lintao Li, Chengdu (CN); Yipeng Liu, Chengdu (CN); Ping Liu, Chengdu (CN); Meijia Wu, Chengdu (CN); Lu Lu, Chengdu (CN); Zeyun Wang, Chengdu (CN); Laiting Ye, Chengdu (CN)

(73) Assignees: Southwest Petroleum University, Chengdu (CN); China University of Geosciences (Wuhan), Wuhan (CN); China University of Petroleum (Beijing), Beijing (CN)

( * ) Notice: Subject to any disclaimer, the term of this patent is extended or adjusted under 35 U.S.C. 154(b) by 0 days.

(21) Appl. No.: 19/054,931

(22) Filed: Feb. 17, 2025

(30) Foreign Application Priority Data

May 31, 2024 (CN) .......................... 202410696142.X

(51) Int. Cl.
*G01N 33/24* (2006.01)
*G01N 15/08* (2006.01)
*G01N 24/08* (2006.01)

(52) U.S. Cl.
CPC .......... *G01N 33/246* (2013.01); *G01N 15/08* (2013.01); *G01N 24/081* (2013.01); *G01N 2015/0866* (2013.01)

(58) Field of Classification Search
CPC ....... E21B 49/00; E21B 43/00; G01N 33/246; G01N 15/08; G01N 24/081; G01N 24/08; G01N 2015/0866; G01N 15/088; G01N 33/24; G01V 1/301; G01V 1/306; G01V 2210/624; G06F 17/11; G06F 17/18; G06F 2119/08
See application file for complete search history.

(56) References Cited

FOREIGN PATENT DOCUMENTS

CN 108150161 B * 7/2021 ............. E21B 49/00

OTHER PUBLICATIONS

Zhang, Kun et al. "Accumulation Mechanism of Marine Shale Gas Reservoir in Anticlines: A Case Study of the Southern Sichuan Basin and Xiuwu Basin in the Yangtze Region." Geofluids (2019): n. pag. (Year: 2019).*
Zhang & Song & Jia & Jiang & Han & Wang & Yuan & Yang & Zeng & Li & Li & Liu & Tang. Formation mechanism of the sealing capacity of the roof and floor strata of marine organic-rich shale and shale itself, and its influence on the characteristics of shale gas and organic matter pore development. (Year: 2022).*
Zhang & Zhang & Song & Jiang & Jiang & Wang & Li & Yin & Chen & Li & Yuan & Liu & Han & Tang & Yang & Zeng. Study on the Formation Mechanism of Shale Roof, Floor Sealing, and Shale Self-Sealing. Frontiers in Earth Science. 9. 10.3389/feart 2021.764287. (Year: 2021).*
SouthWest Petroleum University (Applicant), Claims (allowed) of CN202410696142.X, May 31, 2024.
CNIPA, Notification to grant patent right for invention in CN202410696142.X, Nov. 4, 2024.

* cited by examiner

Primary Examiner — Lisa M Caputo
Assistant Examiner — Eric Sebastian Von Wald
(74) Attorney, Agent, or Firm — Hemisphere Law, PLLC; Zhigang Ma

(57) ABSTRACT

A method for quantitative evaluation of self-sealing property of organic-rich shale includes: S1, selecting geological parameters for evaluating the self-sealing property of the organic-rich shale; S2, taking organic-rich shale samples, and measuring the geological parameters of each sample; S3, calculating a weight coefficient w; of each geological parameter; S4, calculating a self-sealing evaluation coefficient S, and correcting the S to obtain a corrected self-sealing evaluation coefficient S'; S5, establishing a self-sealing evaluation standard of the organic-rich shale according to the S', wherein if S'≥0.6, the self-sealing grade is excellent, if 0.45≤S'<0.6, the self-sealing grade is good, if 0.3≤S'<0.45, the self-sealing grade is medium, and if S'<0.3, the self-sealing grade is poor. According to the method, the self-sealing property of the shale is quantitatively evaluated, and the preservation condition of the shale gas in the shale formation can be more accurately predicted.

6 Claims, No Drawings

METHOD FOR QUANTITATIVE EVALUATION OF SELF-SEALING PROPERTY OF ORGANIC-RICH SHALE

CROSS-REFERENCE TO RELATED APPLICATION

This application claims priority to Chinese patent application No. CN 202410696142.X, filed to China National Intellectual Property Administration (CNIPA) on May 31, 2024, which is herein incorporated by reference in its entirety.

TECHNICAL FIELD

The disclosure relates to the field of shale extraction technologies, and more particularly to a method for quantitative evaluation of self-sealing property of organic-rich shale.

BACKGROUND

Self-sealing property of shale refers to the characteristic that natural gas in the shale formation is difficult to escape due to the low permeability of the rock and special geological conditions, thus being able to be preserved in the rock pores for a long time. Shale sealing index is an important part of the evaluation index system for the recoverability of shale gas. For shale gas, the sealing property of shale is the sealing capacity of shale to the internal shale gas. Shale not only serves as a source rock and reservoir for shale gas, but also acts as a cap rock. The sealing capacity of shale to the internal shale gas is equivalent to the sealing capacity of the cap rock in conventional oil and gas to the oil and gas in the reservoir. Evaluating the self-sealing property of organic-rich shale systems is a prerequisite for deepening the understanding of the microscopic preservation mechanism of shale gas. Previous studies on the self-sealing property of shale are mostly limited to qualitative descriptions, lacking quantitative evaluation, and fail to combine the quantitative sealing property of shale to establish a suitable shale sealing index.

SUMMARY

The disclosure provides a method for quantitative evaluation of self-sealing property of organic-rich shale, aiming at the current situation that the self-sealing property of the shale is mostly limited to qualitative description and lacks a method for quantitatively evaluating the self-sealing property of the shale.

Specifically, the method for quantitative evaluation of self-sealing property of organic-rich shale provided by the disclosure includes steps as follows.

S1, geological parameters for evaluating the self-sealing property of the organic-rich shale are selected, including adsorption gas content, overlying pressure, connectivity difference A, connectivity difference B and bound water content.

The connectivity difference A refers to a difference between connectivity of shale itself and connectivity of roof strata (also referred to as roof shale).

The connectivity difference B refers to a difference between the connectivity of the shale itself and connectivity of floor strata (also referred to as floor shale).

S2, several organic-rich shale samples are taken, and the adsorption gas content, the overlying pressure, the connectivity difference A, the connectivity difference B and the bound water content of each organic-rich shale sample are measured. Specifically, the adsorption gas content is measured by an isothermal adsorption experiment, the overlying pressure is calculated by gravity-logging data, the connectivity is measured by a spontaneous dialysis experiment, and the bound water content is measured by nuclear magnetic resonance (NMR) experiment. Then, the measured geological parameters are normalized one by one to make them in the same comparison scale. The formula of the standardization processing is as follows:

$$Zx_{ij} = \frac{x_{ij} - \min\{x_{1j}, x_{2j}, \ldots, x_{nj}\}}{\max\{x_{1j}, x_{2j}, \ldots x_{nj}\} - \min\{x_{1j}, x_{2j}, \ldots, x_{nj}\}}.$$

In the formula, $x_{ij}$ is a value of an i-th sample of a j-th geological parameter before the standardization processing; $Zx_{ij}$ is a value of the i-th sample of the j-th geological parameter after the standardization processing; min $\{x_{1j}, x_{2j}, \ldots, x_{nj}\}$ is a minimum value of all sample data of the j-th geological parameter; max $\{x_{1j}, x_{2j}, \ldots, x_{nj}\}$ is a maximum value in all sample data of the j-th geological parameter; and j takes values of 1, 2, 3, 4, 5.

S3, a weight coefficient $\omega_j$ of each of the five geological parameters is calculated to obtain five weight coefficients t respectively corresponding to the five geological parameters, where j represents the j-th geological parameter. The calculation method is as follows.

S31, a proportion of the value of the i-th sample of the j-th geological parameter after the standardization processing in the j-th geological parameter is calculated as follows:

$$Q_{ij} = \frac{Zx_{ij}}{\sum_{i=1}^{n} Zx_{ij}}.$$

In the formula, $Zx_{ij}$ is the value of the i-th sample of the j-th geological parameter after the standardization processing; i=1, ..., n; j=1, ..., m; n is a number of samples; and m is a number of geological parameters, and m=5.

S32, an entropy value $E_j$ of the j-th geological parameter after the standardization processing is calculated as follows:

$$E_j = -k \sum_{i=0}^{n} Q_{ij} \times \ln(Q_{ij}).$$

In the formula, k is a constant, $$k = \frac{1}{\ln(n)}.$$

S33, a weight $w_j$ of the j-th geological parameter after the standardization processing is calculated as follows:

$$\omega_j = 1 - E_j.$$

S34, the weights are normalized to ensure that a sum of all the weights is 1 as follows:

$$\omega_{j'} = \frac{\omega_j}{\sum_{j}^{m} \omega_j}.$$

In the formula, m is the number of geological parameters, m=5.

S4, making $\omega_j=t$, the five weight coefficients t are sorted according to a sequence from large to small: $t_1>t_2>t_3>t_4>t_5$, so that a standardized geological parameter corresponding to the maximum weight coefficient $t_1$ is $P_1$, a standardized geological parameter corresponding to the weight coefficient $t_2$ is $P_2$, a standardized geological parameter corresponding to the weight coefficient $t_3$ is $P_3$, a standardized geological parameter corresponding to the weight coefficient $t_4$ is $P_4$, and a standardized geological parameter corresponding to the weight coefficient $t_5$ is $P_5$.

S5, a self-sealing evaluation coefficient S is calculated, and the formula of the self-sealing evaluation coefficient S is as follows:

$$S = t_1 \times P_1^3 + t_2 \times P_2^2 + t_3 \times P_3 + t_4 \times \sqrt[2]{P_4} + t_5 \times \sqrt[3]{P_5}.$$

S6, the self-sealing evaluation coefficient S is corrected by taking a measured total gas content Q corresponding to different samples as a constraint, and a functional relation between the self-sealing evaluation coefficient S and the measured total gas content Q is established by taking the self-sealing evaluation coefficient S as a dependent variable and the measured total gas content Q as an independent variable using a least square method, namely, a correction formula of the self-sealing evaluation coefficient S as follows:

$$S'=aQ+b.$$

In the formula, S' is a corrected self-sealing evaluation coefficient, a is a slope, and b is an intercept; and calculation formulas of the a and the b are as follows:

$$a = \frac{\sum_{i=1}^{n}(Q_i - \overline{Q})(S_i - \overline{S})}{\sum_{i=1}^{n}(Q_i - \overline{Q})^2},$$

$$b = \overline{S} - a\overline{Q}.$$

In the formula, $Q_i$ is a measured total gas content corresponding to the i-th sample, $\overline{Q}$ is an average value of the measured total gas content of all samples, $S_i$ is a self-sealing evaluation coefficient of the i-th sample before correction, and S is an average value of the self-sealing evaluation coefficients of all samples before correction.

S7, the measured total gas content Q corresponding to different samples is substituted into the correction formula established in the step S6 to obtain the corrected self-sealing evaluation coefficient S', and establishing a self-sealing evaluation standard of the organic-rich shale according to the corrected self-sealing evaluation coefficient S' as follows:

in response to the corrected self-sealing evaluation coefficient S' greater than or equal to 0.6, representing excellent self-sealing grade;

in response to the corrected self-sealing evaluation coefficient S' greater than or equal to 0.45 and less than 0.6, representing good self-sealing grade;

in response to the corrected self-sealing evaluation coefficient S' greater than or equal to 0.3 and less than 0.45, representing medium self-sealing grade;

in response to the corrected self-sealing evaluation coefficient S' less than 0.3, representing poor self-sealing grade.

Compared with the related art, the disclosure has the advantages as follows.

According to the disclosure, an evaluation index of the self-sealing property of the shale is established according to the geological parameters, so as to provide the method for the quantitative evaluation of the self-sealing property of the organic-rich shale, which can more accurately predict the preservation status of shale gas in shale formation, thereby improving the evaluation accuracy of shale gas resources, providing geological basis and theoretical support for shale gas exploration and development, and reducing exploration risks.

Other advantages, objects and features of the disclosure will be partly reflected in the following description, and partly understood by those skilled in the art through the study and practice of the disclosure.

DETAILED DESCRIPTION OF EMBODIMENTS

Hereinafter, the illustrated embodiments of the disclosure will be described, and it should be understood that the illustrated embodiments described herein are only used to illustrate and explain the disclosure, and are not used to limit the disclosure.

Specifically, a method for quantitative evaluation of self-sealing property of organic-rich shale includes the following detailed steps.

(1) Geological parameters are selected to evaluate the self-sealing property of the organic-rich shale. Adsorption gas content reflects the strength of shale adsorption capacity. Methane molecules adhere to pores on the surface of organic matter and minerals by adsorption, forming an adsorption gas layer, which hinders the free flow of gas, thus enhancing the self-sealing property of shale. Therefore, the higher the adsorption gas content, the stronger the self-sealing property of shale. The increase of overlying pressure can close the micro-nano throat in shale, thus forming a higher breakthrough pressure and enhancing the sealing capacity of shale. Therefore, the greater the overlying pressure, the stronger the self-sealing capacity of shale. Organic-rich shale itself has good connectivity, but its roof and floor strata connectivity is poor, which can minimize the escape of gas, while maintaining the accumulation of internal gas, thus conducive to the preservation and enrichment of shale gas. Therefore, the greater the difference in connectivity between shale itself and roof and floor strata, the better the self-sealing property of shale. Most of the micro-nano pores in shale are occupied by water molecules, and the water film and capillary water formed by these water molecules can effectively seal pore channels and prevent gas dispersion, thus enhancing the self-sealing property of shale. Therefore, the higher the bound water content, the stronger the self-sealing property of shale. In this situation, the disclosure selects the adsorption gas content, the overlying pressure, the difference between the connectivity of organic-rich shale itself and the connectivity of the roof strata, the difference between the connectivity of organic-rich shale itself and the connectivity of the floor strata, and the bound water content as evaluation parameters, which can well reflect the strength of the self-sealing property of organic-rich shale. Among them, the adsorption gas content is measured by isothermal adsorption experiment, the overlying pressure is calculated by gravity-logging data, the connectivity is measured by spontaneous dialysis experiment, and the bound water content is measured by NMR experiment. In this embodiment, the selected organic-rich shale samples and the test results of geological parameters of each sample are shown in Table 1.

TABLE 1

Original data of evaluation parameters

| Well | Stratum | Sample number | Adsorption gas content (m³/t) | Overlying pressure (MPa) | Connectivity difference A | Connectivity difference B | Bound water content (%) | Gas content Q (m³/t) |
|---|---|---|---|---|---|---|---|---|
| A1 | L1 | 1  | 1.76 | 92.42 | 0.17 | 0.25 | 12.3 | 10.2 |
|    | L2 | 2  | 2.31 | 84.68 | 0.23 | 0.31 | 8.4  | 11.1 |
|    | L3 | 3  | 0.92 | 77.17 | 0.29 | 0.19 | 5.6  | 3.3  |
| A2 | L1 | 4  | 1.23 | 90.72 | 0.15 | 0.21 | 14.4 | 7.3  |
|    | L2 | 5  | 1.65 | 85.23 | 0.27 | 0.28 | 21.5 | 12.1 |
|    | L3 | 6  | 2.54 | 78.92 | 0.25 | 0.21 | 19.1 | 8.2  |
| A3 | L1 | 7  | 0.78 | 93.16 | 0.18 | 0.27 | 9.8  | 6.6  |
|    | L2 | 8  | 2.01 | 83.89 | 0.19 | 0.33 | 13.7 | 10.6 |
|    | L3 | 9  | 1.34 | 76.59 | 0.27 | 0.17 | 16.4 | 4.9  |
| A4 | L1 | 10 | 1.59 | 92.87 | 0.2  | 0.24 | 7.5  | 7.7  |
|    | L2 | 11 | 2.11 | 85.98 | 0.25 | 0.35 | 23   | 13.2 |
|    | L3 | 12 | 0.83 | 78.56 | 0.33 | 0.18 | 21.2 | 7.5  |
| A5 | L1 | 13 | 1.47 | 91.35 | 0.19 | 0.21 | 18.3 | 8.3  |
|    | L2 | 14 | 2.82 | 83.75 | 0.2  | 0.32 | 10.1 | 9.8  |
|    | L3 | 15 | 1.75 | 77.69 | 0.31 | 0.23 | 7.9  | 6.5  |

(2) The measured geological parameters are performed with standardization processing to make them in the same comparison scale. The formula for the standardization processing is as follows:

$$Zx_{ij} = \frac{x_{ij} - \min\{x_{1j}, x_{2j}, \ldots, x_{nj}\}}{\max\{x_{1j}, x_{2j}, \ldots, x_{nj}\} - \min\{x_{1j}, x_{2j}, \ldots, x_{nj}\}}. \quad (1)$$

In the formula, $x_{ij}$ is a value of an i-th sample of a j-th geological parameter before the standardization processing; $Zx_{ij}$ is a value of the i-th sample of the j-th geological parameter after the standardization processing; $\min\{x_{1j}, x_{2j}, \ldots, x_{nj}\}$ is a minimum value of all sample data of the j-th geological parameter; $\max\{x_{1j}, x_{2j}, \ldots, x_{nj}\}$ is a maximum value in all sample data of the j-th geological parameter.

The data of each geological parameter after standardization are shown in Table 2.

(3) The weight coefficients of geological parameters for evaluation of the self-sealing property of organic-rich shale are determined, including the following steps.

a. The proportion $Q_{ij}$ of the value of the i-th sample of the j-th geological parameter after the standardization processing in the j-th geological parameter is calculated as follows:

$$Q_{ij} = \frac{Zx_{ij}}{\sum_{i=1}^{n} Zx_{ij}}. \quad (2)$$

In the formula, $Zx_{ij}$ is the value of the i-th sample of the j-th geological parameter after the standardization processing; $i=1, \ldots, n$; $j=1, \ldots, m$; n is a number of samples; and m is a number of geological parameters. In this embodiment, n=15 and m=5. The calculation results are shown in Table 3.

TABLE 2

Data of each parameter after standardization

| Well | Stratum | Sample number | Adsorption gas content | Overlying pressure | Connectivity difference A | Connectivity difference B | Bound water content |
|---|---|---|---|---|---|---|---|
| A1 | L1 | 1  | 0.48 | 0.96 | 0.11 | 0.44 | 0.39 |
|    | L2 | 2  | 0.75 | 0.49 | 0.44 | 0.78 | 0.16 |
|    | L3 | 3  | 0.07 | 0.04 | 0.78 | 0.11 | 0.00 |
| A2 | L1 | 4  | 0.22 | 0.85 | 0.00 | 0.22 | 0.51 |
|    | L2 | 5  | 0.43 | 0.52 | 0.67 | 0.61 | 0.91 |
|    | L3 | 6  | 0.86 | 0.14 | 0.56 | 0.22 | 0.78 |
| A3 | L1 | 7  | 0.00 | 1.00 | 0.17 | 0.56 | 0.24 |
|    | L2 | 8  | 0.60 | 0.44 | 0.22 | 0.89 | 0.47 |
|    | L3 | 9  | 0.27 | 0.00 | 0.67 | 0.00 | 0.62 |
| A4 | L1 | 10 | 0.40 | 0.98 | 0.28 | 0.39 | 0.11 |
|    | L2 | 11 | 0.65 | 0.57 | 0.56 | 1.00 | 1.00 |
|    | L3 | 12 | 0.02 | 0.12 | 1.00 | 0.06 | 0.90 |
| A5 | L1 | 13 | 0.34 | 0.89 | 0.22 | 0.22 | 0.73 |
|    | L2 | 14 | 1.00 | 0.43 | 0.28 | 0.83 | 0.26 |
|    | L3 | 15 | 0.48 | 0.07 | 0.89 | 0.33 | 0.13 |

TABLE 3

Q$_{ij}$ values of different sample values of parameters

| Well | Stratum | Sample number | Adsorption gas content | Overlying pressure | Connectivity difference A | Connectivity difference B | Bound water content |
|---|---|---|---|---|---|---|---|
| A1 | L1 | 1  | 0.07 | 0.13 | 0.02 | 0.07 | 0.05 |
|    | L2 | 2  | 0.11 | 0.07 | 0.07 | 0.12 | 0.02 |
|    | L3 | 3  | 0.01 | 0.00 | 0.11 | 0.02 | 0.00 |
| A2 | L1 | 4  | 0.03 | 0.11 | 0.00 | 0.03 | 0.07 |
|    | L2 | 5  | 0.06 | 0.07 | 0.10 | 0.09 | 0.13 |
|    | L3 | 6  | 0.13 | 0.02 | 0.08 | 0.03 | 0.11 |
| A3 | L1 | 7  | 0.00 | 0.13 | 0.02 | 0.08 | 0.03 |
|    | L2 | 8  | 0.09 | 0.06 | 0.03 | 0.13 | 0.06 |
|    | L3 | 9  | 0.04 | 0.00 | 0.10 | 0.00 | 0.09 |
| A4 | L1 | 10 | 0.06 | 0.13 | 0.04 | 0.06 | 0.02 |
|    | L2 | 11 | 0.10 | 0.08 | 0.08 | 0.15 | 0.14 |
|    | L3 | 12 | 0.00 | 0.02 | 0.15 | 0.01 | 0.12 |
| A5 | L1 | 13 | 0.05 | 0.12 | 0.03 | 0.03 | 0.10 |
|    | L2 | 14 | 0.15 | 0.06 | 0.04 | 0.13 | 0.04 |
|    | L3 | 15 | 0.07 | 0.01 | 0.13 | 0.05 | 0.02 | b. An entropy value of the j-th geological parameter after the standardization processing is calculated, and the formula is as follows:

$$E_j = -k \sum\nolimits_{i=0}^{n} Q_{ij} \times ln(Q_{ij}). \quad (3)$$

In the formula, k is a constant, $$k = \frac{1}{\ln(n)} = \frac{1}{\ln(15)} = 0.3693.$$

The calculation results are shown in Table 4.

TABLE 4

Entropy values of evaluation parameters

| Adsorption gas content | Overlying pressure | Connectivity difference A | Connectivity difference B | Bound water content |
|---|---|---|---|---|
| $E_1$ | $E_2$ | $E_3$ | $E_4$ | $E_5$ |
| 0.9028 | 0.8847 | 0.9138 | 0.8989 | 0.9067 | c. A weight $w_j$ of the j-th geological parameter after the standardization processing is calculated as follows, and the formula is as follows:

$$\omega_j = 1 - E_j \quad (4).$$

The calculation results are shown in Table 5.

TABLE 5

Weights of evaluation parameters

| Adsorption gas content | Overlying pressure | Connectivity difference A | Connectivity difference B | Bound water content |
|---|---|---|---|---|
| $\omega_1$ | $\omega_2$ | $\omega3$ | $\omega_4$ | $\omega_5$ |
| 0.9028 | 0.8847 | 0.9138 | 0.8989 | 0.9067 | d. The weights are normalized according to the formula (5) to ensure that the sum of all weights is 1, and the calculation results are shown in Table 6.

$$\omega_{j'} = \frac{\omega_j}{\sum_{j}^{m} \omega_j}. \quad (5)$$

TABLE 6

Normalized weight coefficient of each evaluation parameter

| Adsorption gas content | Overlying pressure | Connectivity difference A | Connectivity difference B | Bound water content |
|---|---|---|---|---|
| $\omega_1'$ | $\omega_2'$ | $\omega_3'$ | $\omega_4'$ | $\omega_5'$ |
| 0.1971 | 0.2339 | 0.1748 | 0.2050 | 0.1892 |

(4) Making $\omega_{j'}=t$, the five weight coefficients t are sorted according to a sequence from large to small: $t_1>t_2>t_3>t_4>t_5$. The maximum weight coefficient $t_1=0.2339$, the corresponding geological parameter is overlying pressure, and the normalized overlying pressure is $P_1$. The second largest weight coefficient $t_2=0.2050$, the corresponding geological parameter is connectivity difference B, and the normalized connectivity difference B is $P_2$. The third largest weight coefficient $t_3=0.1971$, the corresponding geological parameter is adsorption gas content, and the normalized adsorption gas content is $P_3$. The fourth largest weight coefficient $t_4=0.1892$, the corresponding geological parameter is bound water content, and the normalized bound water content is $P_4$. The minimum weight coefficient $t_5=0.1748$, the corresponding geological parameter is connectivity difference A, and the normalized connectivity difference A is $P_5$.

(5) Comprehensively considering the adsorption gas content, the overlying pressure, the difference between the connectivity of organic-rich shale and the connectivity of the roof strata, the difference between the connectivity of organic-rich shale and the connectivity of the floor strata, and the bound water content, the self-sealing evaluation coefficient S of organic-rich shale is calculated as follows:

$$S = t_1 \times P_1^3 + t_2 \times P_2^2 + t_3 \times P_3 + t_4 \times \sqrt[2]{P_4} + t_5 \times \sqrt[3]{P_5}).$$

In this embodiment:

$$S = 0.2339 \times \text{overlying pressure}^3 +$$
$$0.2050 \times \text{connectivity difference } B^2 + 0.1971 \times \text{adsorption gas content} +$$
$$0.1892 \times \sqrt[2]{\text{bound water content}} + t_5 \times \sqrt[3]{\text{connectivity difference } A}.$$

(6) The self-sealing evaluation coefficient S is corrected by taking a measured total gas content Q corresponding to different samples as a constraint, and a functional relation between the self-sealing evaluation coefficient S and the measured total gas content Q is established by taking the self-sealing evaluation coefficient S as a dependent variable and the measured total gas content Q as an independent variable using a least square method, namely, a correction formula of the self-sealing evaluation coefficient S as follows:

$$S' = aQ + b.$$

In the formula, S' is a corrected self-sealing evaluation coefficient, a is a slope, and b is an intercept; and calculation formulas of the a and the b are as follows:

$$a = \frac{\sum_{i=1}^{n}(Q_i - \overline{Q})(S_i - \overline{S})}{\sum_{i=1}^{n}(Q_i - \overline{Q})^2},$$
$$b = \overline{S} - a\overline{Q}.$$

In the formula, $Q_i$ is a measured total gas content corresponding to the i-th sample, $\overline{Q}$ is an average value of the measured total gas content of all samples, $S_i$ is a self-sealing evaluation coefficient of the i-th sample before correction, and $\overline{S}$ is an average value of the self-sealing evaluation coefficients of all samples before correction.

In this embodiment, $$a = \frac{\sum_{i=1}^{n}(Q_i - \overline{Q})(S_i - \overline{S})}{\sum_{i=1}^{n}(Q_i - \overline{Q})^2} = 0.0412,$$

$b = \overline{S} - a\overline{Q} = 0.115$, namely, $S' = 0.0412Q + 0.115$.

(7) The measured total gas content Q corresponding to different samples is substituted into the formula $S' = 0.0412Q + 0.115$ to obtain the corrected self-sealing evaluation coefficient S' of different samples.

(8) Based on the corrected self-sealing evaluation coefficient S' of different samples and the established self-sealing evaluation standard of organic-rich shale, each sample is evaluated, and the evaluation results are shown in Table 7.

TABLE 7

Self-sealing evaluation results of organic-rich shale

| Well | Stratum | Sample number | Corrected self-sealing evaluation coefficient S' | Self-sealing grade |
|---|---|---|---|---|
| A1 | L1 | 1 | 0.54 | good |
|  | L2 | 2 | 0.57 | good |
|  | L3 | 3 | 0.25 | poor |
| A2 | L1 | 4 | 0.42 | medium |
|  | L2 | 5 | 0.61 | excellent |
|  | L3 | 6 | 0.45 | good |

TABLE 7-continued

Self-sealing evaluation results of organic-rich shale

| Well | Stratum | Sample number | Corrected self-sealing evaluation coefficient S' | Self-sealing grade |
|---|---|---|---|---|
| A3 | L1 | 7 | 0.39 | medium |
|  | L2 | 8 | 0.55 | good |
|  | L3 | 9 | 0.32 | medium |
| A4 | L1 | 10 | 0.43 | medium |
|  | L2 | 11 | 0.66 | excellent |
|  | L3 | 12 | 0.42 | medium |
| A5 | L1 | 13 | 0.46 | good |
|  | L2 | 14 | 0.52 | good |
|  | L3 | 15 | 0.38 | medium |

The above is only the illustrated embodiment of the disclosure, and it does not limit the disclosure in any form. Although the disclosure has been disclosed in the illustrated embodiment, it is not used to limit the disclosure. Any person skilled in the art, within the scope of the technical solution of the disclosure, when using the above disclosed technical content to make some changes or modification for equivalent changes in the equivalent embodiment, but not out of the content of the technical solution of the disclosure, according to the technical substance of the disclosure of the above embodiment of any simple modifications, equivalent changes and modifications, are still within the scope of the technical solution of the disclosure.

What is claimed is:

1. A method for quantitative evaluation of self-sealing property of organic-rich shale, comprising:

S1, selecting geological parameters for evaluating the self-sealing property of the organic-rich shale, wherein the geological parameters comprise five geological parameters of adsorption gas content, overlying pressure, connectivity difference A, connectivity difference B and bound water content;

wherein the connectivity difference A is a difference between connectivity of shale itself and connectivity of roof strata;

wherein the connectivity difference B is a difference between the connectivity of the shale itself and connectivity of floor strata;

S2, taking a plurality of organic-rich shale samples, measuring the adsorption gas content, the overlying pressure, the connectivity difference A, the connectivity difference B and the bound water content of each of the plurality of organic-rich shale samples, and then carrying out standardization processing on each of the five geological parameters to obtain standardized geological parameters $Zx_{ij}$, wherein the standardized geological parameter for the j-th geological parameter is denoted as $P_j$, and a formula of the standardization processing is as follows:

$$Zx_{ij} = \frac{x_{ij} - \min\{x_{1j}, x_{2j}, \ldots, x_{nj}\}}{\max\{x_{1j}, x_{2j}, \ldots, x_{nj}\} - \min\{x_{1j}, x_{2j}, \ldots, x_{nj}\}},$$

where $x_{ij}$ is a value of an i-th sample of a j-th geological parameter before the standardization processing; $Zx_{ij}$ is a value of the i-th sample of the j-th geological parameter after the standardization processing; min $\{x_{1j}, x_{2j}, \ldots, x_{nj}\}$ is a minimum value of all sample data of the j-th geological parameter, max $\{x_{1j}, x_{2j}, \ldots, x_{nj}\}$ is a maximum value in all sample data of the j-th geological parameter; and j=1, 2, 3, 4, 5;

S3, calculating a weight coefficient $\omega_j$ of each of the five geological parameters to obtain five weight coefficients respectively corresponding to the five geological parameters, where $\omega_j = t_j$;

S4, sorting the five weight coefficients in descending order to obtain an ordered sequence: $t_1 > t_2 > t_3 > t_4 > t_5$, wherein a standardized geological parameter corresponding to the weight coefficient $t_1$ is $P_1$, a standardized geological parameter corresponding to the weight coefficient $t_2$ is $P_2$, a standardized geological parameter corresponding to the weight coefficient $t_3$ is $P_3$, a standardized geological parameter corresponding to the weight coefficient $t_4$ is $P_4$, and a standardized geological parameter corresponding to the weight coefficient $t_5$ is $P_5$;

S5, calculating a self-sealing evaluation coefficient S, wherein a formula of the self-sealing evaluation coefficient S is as follows:

$$S = t_1 \times P_1^3 + t_2 \times P_2^2 + t_3 \times P_3 + t_4 \times \sqrt[2]{P_4} + t_5 \times \sqrt[3]{P_5};$$

S6, correcting the self-sealing evaluation coefficient S by taking a measured total gas content Q corresponding to different samples as a constraint, and establishing a functional relation between the self-sealing evaluation coefficient S and the measured total gas content Q by taking the self-sealing evaluation coefficient S as a dependent variable and the measured total gas content Q as an independent variable using a least square method, namely, a correction formula of the self-sealing evaluation coefficient S as follows:

$$S' = aQ + b,$$

where S' is a corrected self-sealing evaluation coefficient, a is a slope, and b is an intercept; and calculation formulas of the a and the b are as follows:

$$a = \frac{\sum_{i=1}^{n}(Q_i - \overline{Q})(S_i - \overline{S})}{\sum_{i=1}^{n}(Q_i - \overline{Q})^2},$$

$$b = \overline{S} - a\overline{Q},$$

where $Q_i$ is a measured total gas content corresponding to the i-th sample, $\overline{Q}$ is an average value of the measured total gas content of all samples, $S_i$ is a self-sealing evaluation coefficient of the i-th sample before correction, and $\overline{S}$ is an average value of the self-sealing evaluation coefficients of all samples before correction;

S7, substituting the measured total gas content Q corresponding to the different samples into the correction formula established in the step S6 to obtain the corrected self-sealing evaluation coefficient S', and establishing, according to the corrected self-sealing evaluation coefficient S', a self-sealing evaluation standard of the organic-rich shale comprising four grades as follows:

an excellent self-sealing grade in response to the corrected self-sealing evaluation coefficient S' greater than or equal to 0.6;

a good self-sealing grade in response to the corrected self-sealing evaluation coefficient S' greater than or equal to 0.45 and less than 0.6;

a medium self-sealing grade in response to the corrected self-sealing evaluation coefficient S' greater than or equal to 0.3 and less than 0.45;

a poor self-sealing grade in response to the corrected self-sealing evaluation coefficient S' less than 0.3.

2. The method for the quantitative evaluation of the self-sealing property of the organic-rich shale as claimed in claim 1, wherein in the step S3, the calculating a weight coefficient $\omega_j$ of each of the five geological parameters comprises:

S31, calculating a proportion of the value of the i-th sample of the j-th geological parameter after the standardization processing in the j-th geological parameter as follows:

$$Q_{ij} = \frac{Zx_{ij}}{\sum_{i=1}^{n} Zx_{ij}},$$

where $Zx_{ij}$ is the value of the i-th sample of the j-th geological parameter after the standardization processing; i=1, . . . , n; n is a number of samples;

S32, calculating an entropy value of the j-th geological parameter after the standardization processing as follows:

$$E_j = -k \sum_{j=0}^{n} Q_{ij} \times \ln(Q_{ij}),$$

where k is a constant, $$k = \frac{1}{\ln(n)};$$

S33, calculating a weight of the j-th geological parameter after the standardization processing as follows:

$$\omega j = 1 - E_j;$$

S34, normalizing the weights to ensure that a sum of all the weights is 1 as follows:

$$\omega_{j'} = \frac{\omega_j}{\sum_{j}^{m} \omega_j},$$

where m=5.

3. The method for the quantitative evaluation of the self-sealing property of the organic-rich shale as claimed in claim 1, wherein in the step S2, the adsorption gas content is measured by an isothermal adsorption experiment.

4. The method for the quantitative evaluation of the self-sealing property of the organic-rich shale as claimed in claim 1, wherein in the step S2, the overlying pressure is calculated based on gravity-logging data.

5. The method for the quantitative evaluation of the self-sealing property of the organic-rich shale as claimed in claim 1, wherein in the step S2, the connectivity of the shale itself, the connectivity of the roof strata, and the connectivity of the floor strata are all measured by a spontaneous dialysis experiment.

6. The method for the quantitative evaluation of the self-sealing property of the organic-rich shale as claimed in claim 1, wherein in the step S2, the bound water content is measured by a nuclear magnetic resonance experiment.

\* \* \* \* \*